A. DU PASQUIER AND J. M. L. SLATER.
AUTOMATIC CIRCUIT INTERRUPTING DEVICE.
APPLICATION FILED DEC. 1, 1916.

1,347,908.
Patented July 27, 1920.

WITNESSES:
R. J. Fitzgerald.
J. R. Langley.

INVENTOR
Arthur Du Pasquier, and
John Mackey Langham Slater.
BY
Wesley G. Carr
ATTORNEY

UNITED STATES PATENT OFFICE.

ARTHUR DU PASQUIER AND JOHN MACKEY LANGHAM SLATER, OF HALE, ENGLAND, ASSIGNORS TO WESTINGHOUSE ELECTRIC AND MANUFACTURING COMPANY, A CORPORATION OF PENNSYLVANIA.

AUTOMATIC CIRCUIT-INTERRUPTING DEVICE.

1,347,908.   Specification of Letters Patent.   Patented July 27, 1920.

Application filed December 1, 1916. Serial No. 134,435.

*To all whom it may concern:*

Be it known that we, ARTHUR DU PASQUIER, a subject of the King of Great Britain, and a resident of Hale, in the county of Chester, England, and JOHN M. L. SLATER, a subject of the King of Great Britain, and a resident of Hale, in the county of Chester, England, have invented a new and useful Improvement in Automatic Circuit-Interrupting Devices, of which the following is a specification.

Our invention relates to automatic circuit-interrupting devices and has particular relation to devices which are arranged to interrupt the circuit of an electric motor upon the occurrence of abnormal conditions.

The chief object of our invention is to provide means whereby, when the motor increases in speed, the current at which the circuit breaker operates to interrupt the motor circuit will be automatically reduced.

Our invention is particularly applicable for use in connection with rolling-mill motors which operate at approximately full load from starting up to about half full speed, after which time the speed increases and the load is reduced, but our invention is not limited to this particular use.

According to our invention, the overload setting of the circuit breaker or relay controlling the same is varied so that, as the field of the motor is weakened and the speed increases, the load at which the circuit breaker operates to interrupt the circuit diminishes. The invention may be carried out in practice in several ways.

Figure 1:
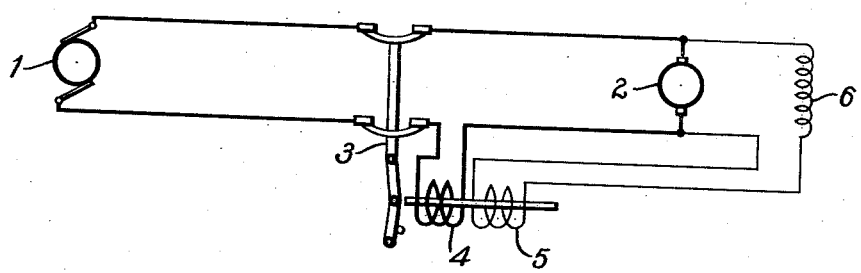
Figure 2:
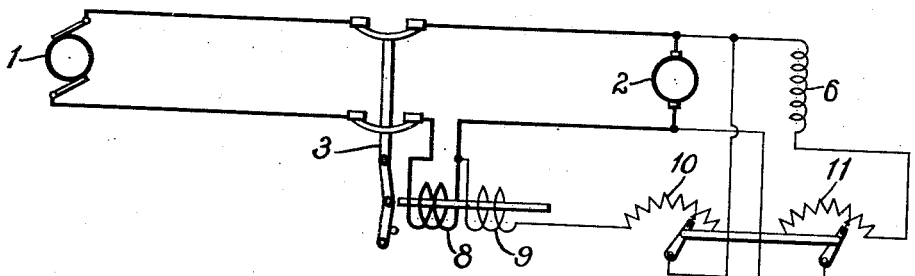
Figure 3:
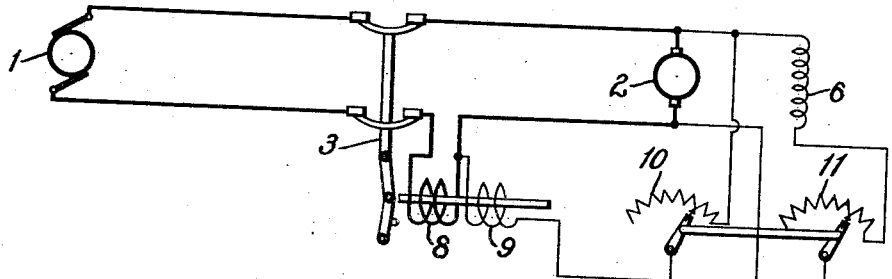

In the accompanying drawing, Figure 1 is a diagrammatic view of circuits and apparatus embodying our invention. Figs. 2 and 3 are views, similar to Fig. 1, of modifications.

In the arrangement illustrated in Fig. 1, which is applicable to shunt-wound motors, a generator 1 supplies energy to a motor 2. A circuit breaker 3 or relay is provided with two actuating coils 4 and 5, one being included in the armature circuit of the motor and the other being included in the field circuit thereof. The coils 4 and 5 are arranged to oppose each other in their action on the circuit-breaker tripping magnet. Consequently, as the value of the current traversing the shunt field-magnet winding 6 of the motor decreases and the current through the coil 5 in circuit therewith is correspondingly reduced, the circuit breaker 3 will be opened when a smaller current is flowing in the armature circuit. It will be obvious that, if the field circuit of the motor is broken, the supply of current to the armature circuit will be immediately cut off, as the series coil 4 will be the only one acting on the circuit breaker. Thus, the motor will be prevented from running away in the event of the field circuit being broken.

A further useful effect which is obtained with a circuit breaker arranged in this manner is that the motor cannot be started against full-load torque until the field has been built up to its full strength because the heavy armature current passing through the series coil of the circuit breaker will cause it to open if the current in the coil 5 in series with the motor field-magnet winding 6 has not risen to its full strength, it being understood that the usual starting resistance will be employed in series with the armature to limit the armature current during the starting period. This resistance has, for simplicity's sake, been omitted from the drawing.

Another method of carrying out our invention is illustrated in Fig. 2. The circuit breaker or relay 3 is provided with two actuating coils 8 and 9 that are arranged to assist each other. The coil 8 is in series-circuit relation with the motor armature while the winding 9 is separately excited. A resistor 10, which is included in the circuit of the separately-excited coil 9, is arranged to be varied so as to increase the current passing through the circuit-breaker coil 9 when the current in the motor-field winding is reduced.

In case the motor is shunt wound and is provided with an adjustable field rheostat 11, as illustrated, the rheostat may be mechanically connected to the means for controlling the variable resistor 10 in circuit with separately excited coil 9 of the circuit breaker or relay 3 in such manner that, as the resistance in the motor field is increased, that in the circuit breaker coil circuit is reduced and vice versa.

In a second modification of our invention, which is illustrated in Fig. 3, the coils 8 and 9 of the circuit breaker or relay may be arranged to operate in a manner opposite to that above described. The resistors 10 and 11 are arranged to be varied in the same direction simultaneously to reduce the currents traversing the coil 9 and the field-magnet winding 6, respectively. By means of this arrangement, the circuit breaker will open the motor circuit when a lower current is flowing through the armature when the motor field is strengthened than will cause it to open when the field is weakened and the speed of the motor is correspondingly increased. In such case, it is obvious that the current at which the circuit breaker opens may be arranged to vary directly as the speed of the motor.

We claim as our invention:

1. In an electrical system, the combination with a translating device having a plurality of windings, of means for controlling the circuit of said device in accordance with the relative values of the currents traversing said windings, said means comprising a movable member and actuating coils therefor in circuit with said windings.

2. In an electrical system, the combination with a dynamo-electric machine having a plurality of windings, of means for controlling the circuit of said dynamo-electric machine in accordance with the relative values of the currents traversing said windings, said means comprising a movable member and actuating coils therefor in circuit with said windings.

3. In an electrical system, the combination with a translating device having a plurality of windings, of means for controlling the circuit of said device in accordance with the relative values of the currents traversing said windings, said means comprising actuating coils in circuit with the respective windings.

4. In an electrical system, the combination with a dynamo-electric machine having a plurality of windings, of means for controlling the circuit of said dynamo-electric machine in accordance with the relative values of the currents traversing said windings, said means comprising actuating coils in circuit with the respective windings.

5. In an electrical system, the combination with an electric motor having an armature winding and a field-magnet winding, of means for controlling the circuit of said motor comprising a plurality of coils wound to oppose each other and in circuit with the respective windings of said motor.

6. In an electrical system, the combination with an electric motor having an armature winding and a field-magnet winding, of means for controlling the circuit of said motor comprising a coil in series with said armature winding and tending to effect the opening of said circuit and a coil in series with the field-magnet winding for opposing the action of the other coil.

7. In an electrical system, the combination with an electric motor having an armature winding, of a circuit interrupter for controlling the main circuit of said motor, said circuit interrupter comprising actuating coils wound to oppose each other and respectively connected in shunt and in series relation to said armature winding.

8. In an electrical system, the combination with an electric motor having an armature winding, of means tending to open the circuit of said motor when the current traversing said armature winding exceeds a predetermined value and for varying the current value at which the motor circuit is opened in accordance with the operating conditions of said motor.

9. In an electrical system, the combination with an electric motor having an armature winding and a shunt field-magnet winding, of means tending to open the circuit of said motor when the current traversing said armature winding exceeds a predetermined value, and means for simultaneously varying the current value at which the motor circuit is opened and varying the resistance of the shunt field-magnet winding circuit.

In testimony whereof we have hereunto subscribed our names this 17th day of August, 1916.

ARTHUR DU PASQUIER.
JOHN MACKEY LANGHAM SLATER.

Witnesses:
FREDERICK NIXON,
G. W. PISONER.